(12) United States Patent
Jones

(10) Patent No.: US 8,234,369 B2
(45) Date of Patent: Jul. 31, 2012

(54) WEB PAGE RESPONSE MONITORING

(75) Inventor: Lawrence W. Jones, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 441 days.

(21) Appl. No.: 12/342,127

(22) Filed: Dec. 23, 2008

(65) Prior Publication Data

US 2010/0161787 A1    Jun. 24, 2010

(51) Int. Cl.
*G06F 15/173* (2006.01)
(52) U.S. Cl. .......................................................... 709/224
(58) Field of Classification Search .................. 709/220, 709/201, 219, 217, 218, 247–249, 238, 232, 709/224, 226, 203, 245; 707/501, 505, 506, 707/530, 513; 715/215, 735, 736, 740; 370/230, 370/231, 232, 352, 389, 229, 254, 360
See application file for complete search history.

(56) References Cited

U.S. PATENT DOCUMENTS

| | | | |
|---|---|---|---|
| 7,580,356 B1 * | 8/2009 | Mishra et al. | 370/230.1 |
| 7,962,582 B2 * | 6/2011 | Potti et al. | 709/220 |
| 2002/0065912 A1 * | 5/2002 | Catchpole et al. | 709/224 |
| 2003/0086422 A1 * | 5/2003 | Klinker et al. | 370/389 |
| 2003/0088671 A1 * | 5/2003 | Klinker et al. | 709/225 |
| 2003/0217162 A1 * | 11/2003 | Fu et al. | 709/229 |

* cited by examiner

*Primary Examiner* — Joseph Avellino
*Assistant Examiner* — Mark O Afolabi

(57) ABSTRACT

A device receives a list of uniform resource locators (URLs), selects a web page URL from the list of URLs, and requests, via a browser application, content corresponding to the selected web page URL. The device also receives, via a packet capture, a web page associated with the selected web page URL, derives performance information associated with the packet capture, parses the packet capture to extract page level statistics, connection level statistics, and inline object level statistics, and stores the page level statistics, the connection level statistics, and the inline object level statistics to output files.

21 Claims, 14 Drawing Sheets

WEB PAGE RESPONSE MONITORING

BACKGROUND

As the bit rates offered for broadband Internet access services (e.g. broadband cable, digital subscriber line (DSL), fiber to the home (FTTH), etc.) reach greater capacities, consumers (or users) of those services may expect an improved user experience commensurate with higher access bandwidths. Moreover, consumers that pay more for higher bandwidth service tiers provided by an Internet service provider (ISP) may expect a better user experience for their investment. Thus, some ISPs measure what their users experience (e.g., a consumer Internet experience) in order to determine the quality of the services being provided.

Many ISPs utilize performance monitoring tools to measure the services that they provide. For example, since a goal of ISPs is to transport Internet protocol (IP) packets from one point to another point, many performance monitoring tools operate at the IP packet layer (or network layer). Active monitoring tools (e.g., pinging) and passive monitoring tools (e.g., packet level statistics, port utilization, packet discards, etc.) are supported in many IP routers. Application layer performance monitoring tools address metrics deemed most relevant to what a user experiences when executing a particular application over a network, such as the Internet. Monitoring performance associated with web page response (e.g., during access of web pages) and the network path traversed to access the web page may provide information to ISPs supporting the web pages.

Accessing a web page is an example of using a service delivered via the Internet. When a user accesses a web page (or web site) through a local browser application (e.g., Internet Explorer, Netscape, FireFox, etc.), the application downloads content corresponding to the web page and renders (displays) the web page. A web page generally includes one or more constituent files (e.g., inline objects) that represent individual components (e.g., images, frames, text, etc.) making up the complete web page as displayed by the browser application. Each inline object, including the web page itself, is identified by a uniform resource locator (URL) that uniquely identifies the location of the web page on the Internet. Web pages are generally coded in hypertext markup language (HTML). In order to display a web page, the browser application first requests the web page content, and then parses the HTML associated with the web page to gather references to remaining URLs and instructions for displaying the web page. The browser application executes requests required to obtain remaining inline objects necessary to display the web page.

A measure of how long it takes for a web page to be displayed may be referred to as the response time of the web page or a web page download response time. The web page download response time may be a function of cumulative response times (e.g., inline object response times) associated with inline objects that constitute the web page. A web page may be accessed via an Internet protocol, such as hypertext transfer protocol (HTTP). The most common version of HTTP in use today is HTTP Version 1.1 (or HTTP 1.1). HTTP 1.1 operates over a transport layer provided by a transport control protocol (TCP). HTTP 1.1 distinguishes itself from HTTP 1.0, an earlier version of HTTP, primarily in that it can use the same TCP connection to query one or more inline objects. For HTTP 1.0, a separate TCP connection was established for each individual inline object query.

TCP is a connection oriented protocol that provides a reliable transport layer (over the connectionless Internet protocol) for applications that communicate over IP. Consequently, applications like HTTP that operate over TCP are subject to network layer effects that impact TCP. These include the round trip times of paths from client to/from server (or servers). There is also the potential for packet drops and/or re-orderings (due to transient periods of congestion), packet errors, and other artifacts that may occur at the IP layer. Moreover, a domain name service (DNS) may be invoked by the client (at times prior to and during a web page transaction) to resolve the IP addresses of unresolved host names.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a web page response monitoring tool. The web page response monitoring tool may simulate behavior of a web browsing session (e.g., by a client associated with a user) by automating a sequence of web page downloads, and may measure a range of statistics for the sequence of web page downloads at a web page level, a connection level (e.g., a transport control protocol (TCP) connection level), and/or an inline object level.

Figure 1:
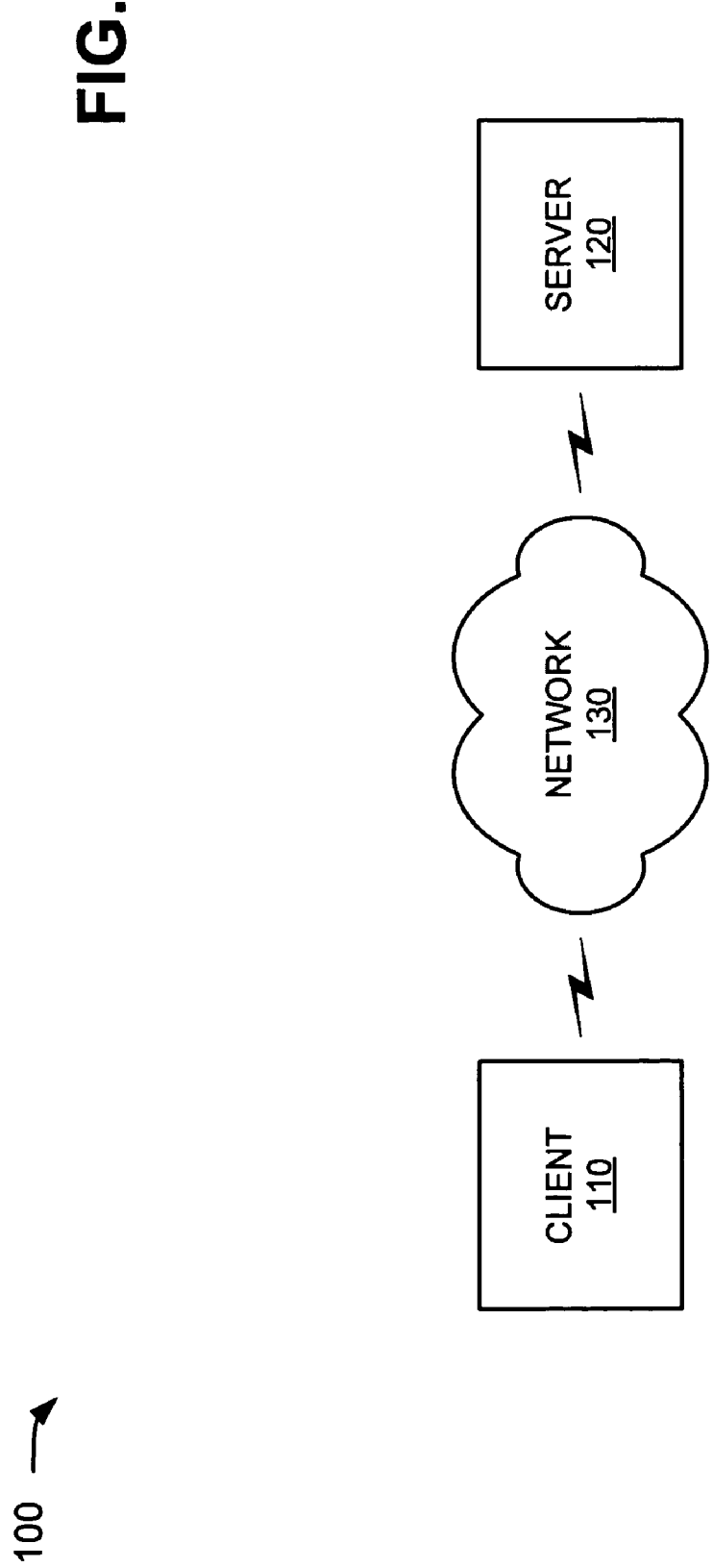
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a client 110 and a server 120 interconnected by a network 130. Components of network 100 may interconnect via wired and/or wireless connections. A single client 110, server 120, and network 130 have been illustrated in FIG. 1 for simplicity. In practice, there may be more clients 110, servers 120, and/or networks 130. Also, in some instances, one or more of the components of network 100 may perform one or more functions described as being performed by another one or more of the components of network 100.

Client 110 may include any device (e.g., an IP-based device) that is capable of accessing server 120 via network 130. For example, client 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a network device (e.g., a gateway, a router, a switch, a firewall, a network interface card (NIC), a hub, a bridge, a proxy server, etc.) or other types of computation or communication devices, threads or processes running on these devices, and/or objects executable by these devices. In one implementation, client 110 may include a web page response monitoring tool that simulates behavior of a web browsing session (e.g., by client 110) by automating a sequence of web page downloads, and measures a range of statistics for the sequence of web page downloads at a web page level, a connection level, and/or an inline object level.

Server 120 may include one or more server entities, or other types of computation or communication devices, that gather, process, search, and/or provide information in a manner described herein. In one implementation, server 120 may be associated with an ISP. Server 120 may include a repository of one or more documents that may be accessed by client 110. A "document," as the term is used herein, is to be broadly interpreted to include any machine-readable and machine-storable work product. A document may include, for example, an e-mail, a web site, a file, a combination of files, one or more files with embedded links to other files, a news group posting, any of the aforementioned, etc. In the context of the Internet, a common document is a web page. A document may include textual information, embedded information (such as meta information, images, hyperlinks, etc.), and/or embedded instructions (such as Javascript, etc.).

In another implementation, server 120 may receive a URL request from client 110, and may provide, to client 110, a web page associated with the requested URL. As server 120 provides the web page associated with the requested URL, web page download performance information may be generated by server 120 and may be received by client 110. Client 110 may utilize the web page download performance information to calculate web page download performance statistics (e.g., web page level statistics, connection level statistics, inline object level statistics, etc.).

Network 130 may include a local area network (LAN), a wide area network (WAN), a metropolitan area network (MAN), a telephone network, such as the Public Switched Telephone Network (PSTN), an intranet, the Internet, or a combination of networks.

Figure 2:
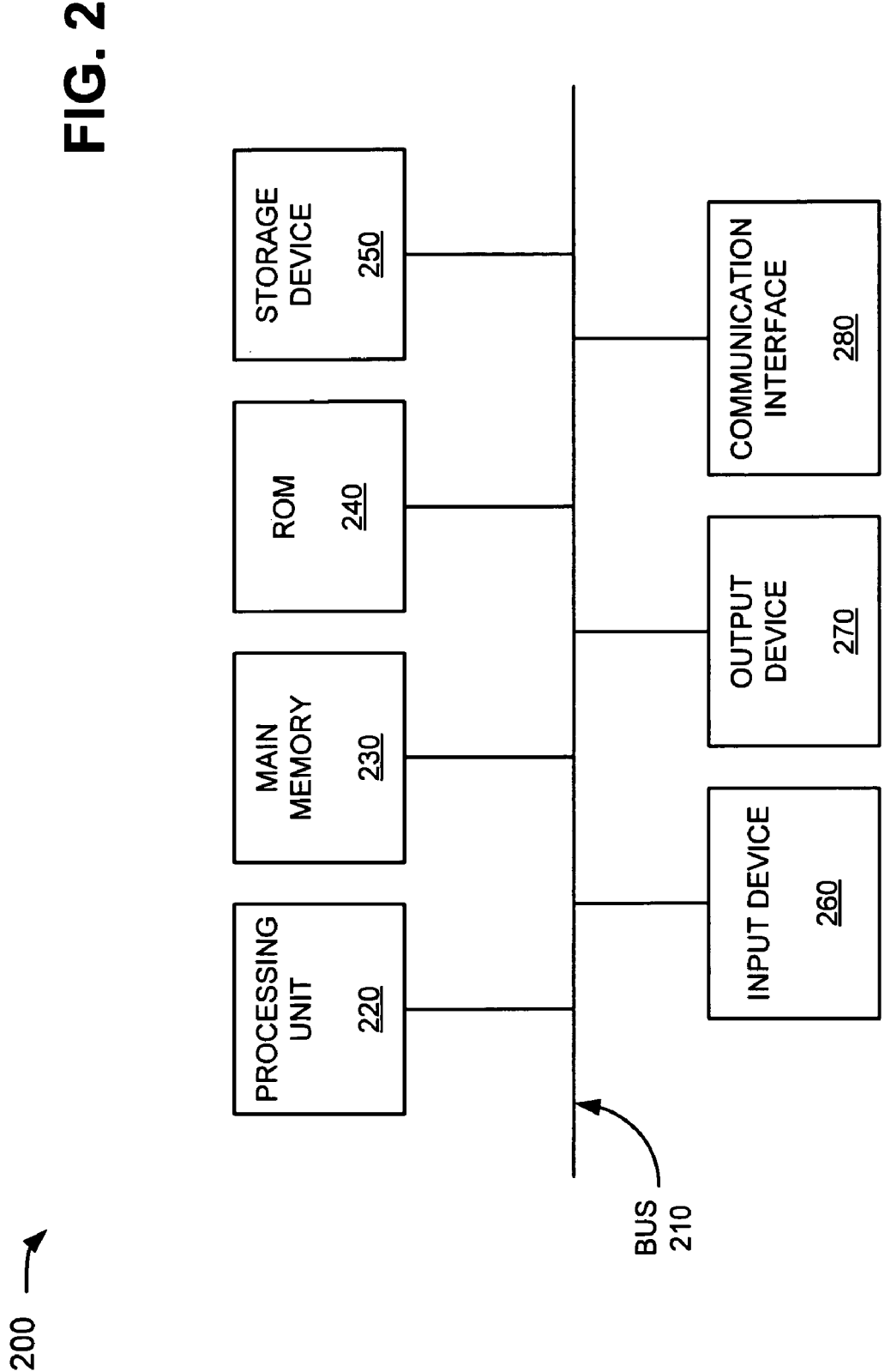
FIG. 2 illustrates a diagram of exemplary components of a client and/or a server depicted in FIG. 1.

FIG. 2 illustrates a diagram of exemplary components of a device 200 that may correspond to client 110 and/or a server 120. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, microprocessor, or other type of processing unit that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
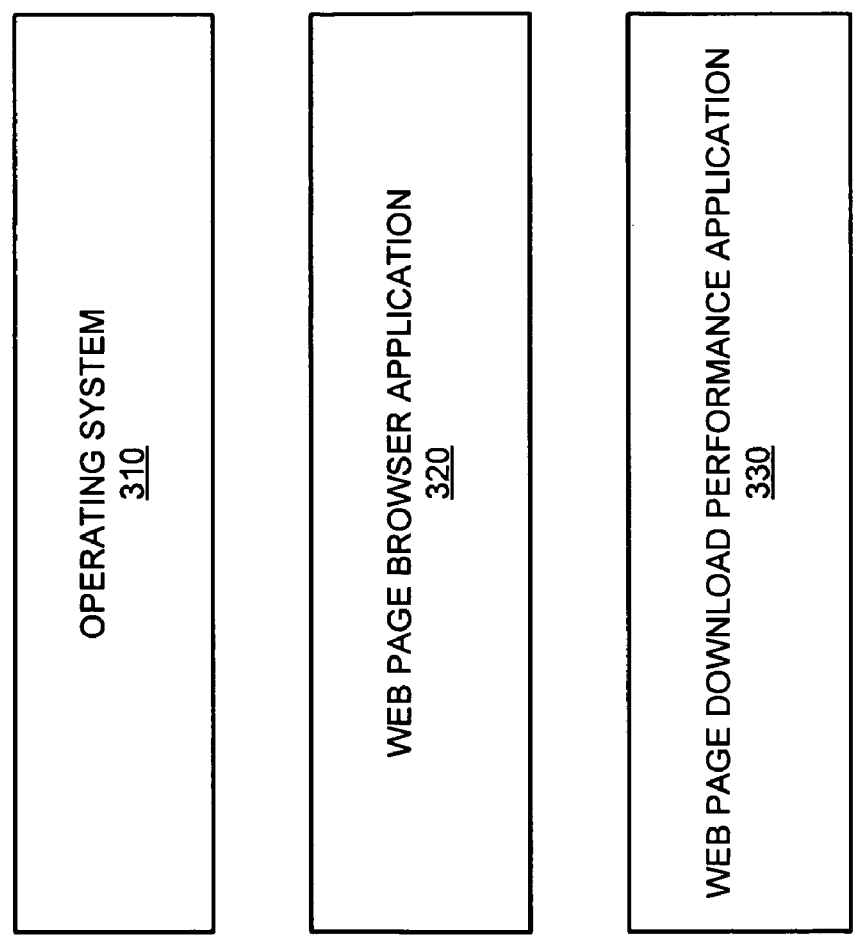
FIG. 3 depicts a diagram of a portion of an exemplary computer-readable medium that may be used by the client and/or the server illustrated in FIG. 1.

FIG. 3 depicts a diagram of a portion of an exemplary computer-readable medium 300 that may be used by client 110 and/or server 120. In one implementation, computer-readable medium 300 may correspond to main memory 230, ROM 240, and/or storage device 250 of device 200. The portion of computer-readable medium 300 illustrated in FIG. 5 may include an operating system 310, a web page browser application 320, and a web page download performance application 330.

Web page browser application 320 and/or web page download performance application 330 may be included in operating system 310 or may be separate from operating system 3 10. Web page browser application 320 and/or web page download performance application 330 may be included in or may be separate from each other. For example, in one implementation, web page download performance application 330 may be a process separate from operating system 310 and/or web page browser application 320. In this implementation, web page download performance application 330 may be provided on a device (e.g., client 110) that is separate from a device that includes operating system 310 and/or web page browser application 320, but may interact with operating system 310 and/or web page browser application 320, e.g., via network 130.

Operating system 510 may include operating system software, such as the Microsoft Windows, Apple MAC OS, Linux, Unix, IBM OS/2, and/or other types of operating systems capable of use in server entities, user devices, or other types of computation or communication devices.

Web page browser application 320 may include an executable object or process. Client 110 and/or server 120 may obtain the executable object or process from another device or from a disk, tape, network, CD-ROM, etc. Alternatively, the executable object or process may be pre-installed on client 110 and/or server 120. In one example, web page browser application 320 may include Internet Explorer, Firefox, Netscape, etc. Web page browser application 320 may be automatically activated upon initiation of operating system 510. Alternatively, web page browser application 320 may be activated when instructed by a user and/or a process. In either case, web page browser application 320 may enable a user to display and interact with text, images, videos, music, games, and other information located on a web page at a web site on the Internet, an intranet, or a local area network, as described herein.

Web page download performance application 330 may include an executable object or process. Client 110 and/or server 120 may obtain the executable object or process from another device or from a disk, tape, network, CD-ROM, etc. Alternatively, the executable object or process may be pre-installed on client 110 and/or server 120. Web page download performance application 330 may perform any of the functions described herein as being performed by client 110 (e.g., by functional components of client 110 described below in connection with FIGS. 5-7). Web page download performance application 330 may be automatically activated upon initiation of operating system 310. Alternatively, web page download performance application 330 may be activated when instructed by a user. In either case, web page download performance application 330 may simulate behavior of a web browsing session by automating a sequence of web page downloads, and may measure a range of statistics for the sequence of web page downloads at a web page level, a connection level, and/or an inline object level, as described herein.

Figure 4:
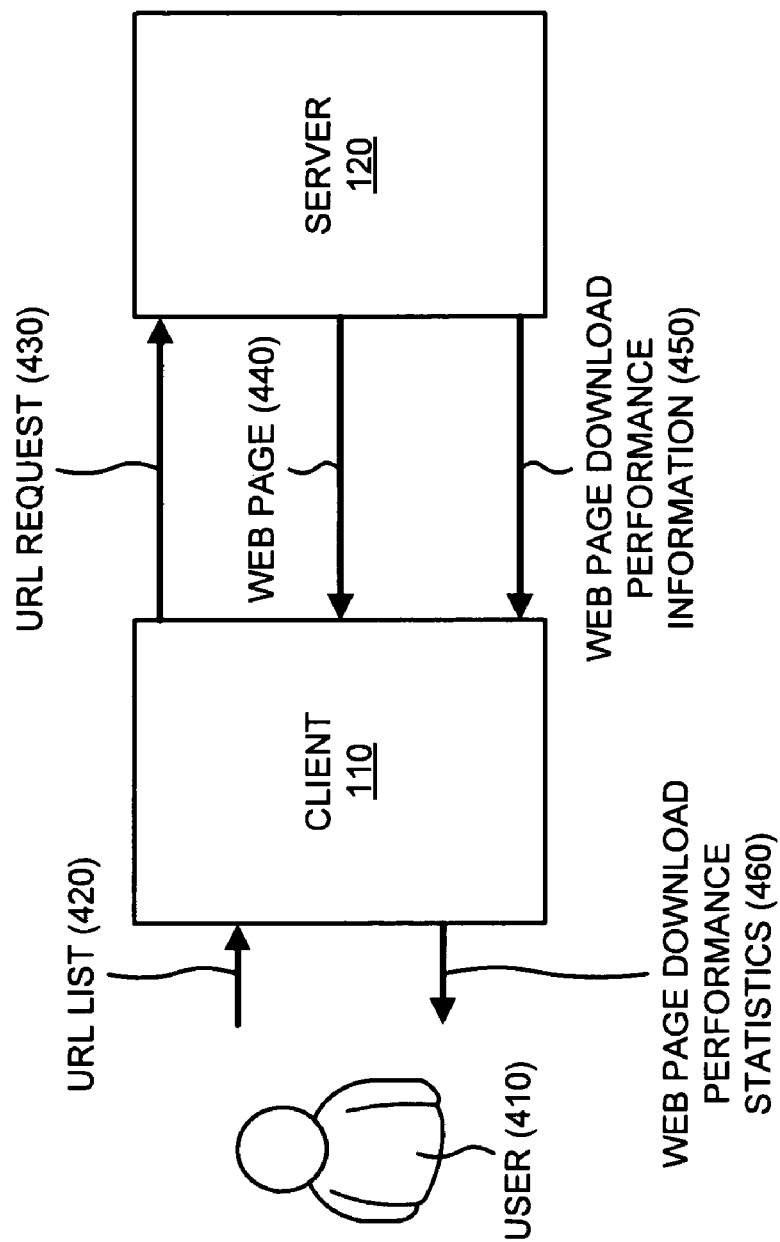
FIG. 4 illustrates a diagram of exemplary interactions among components of an exemplary portion of the network depicted in FIG. 1.

FIG. 4 illustrates a diagram of exemplary interactions among components of an exemplary portion 400 of network 100. As shown, exemplary network portion 400 may include client 110 and server 120. Client 110 and server 120 may include the features described above in connection with FIGS. 1 and 2. As further shown in FIG. 4, client 110 may be associated with a user 410.

In one implementation, user 410 may include a network administrator, a network operator, and/or another person (or persons) responsible for services provided by server 120. In one example, a network administrator/operator may deploy multiple clients 110 executing the web page response monitoring tool described herein so that a statistically significant representation of the services provided by server 120 (and/or network 130) may be received (e.g., by clients 110). In another implementation, user 410 may include one or more consumers of services provided by server 120. The web page response monitoring tool described herein may be executed (e.g., via client 110) by the consumer, and results of the execution may be provided to the person (or persons) responsible for services provided by server 120 and/or network 130 (e.g., via a file transfer, a trouble ticket, etc.).

As further shown in FIG. 4, client 110 may receive a URL list 420 (e.g., from user 410 or from another source). URL list 420 may include a file that maintains a list of web page URLs to be visited in a sequence (e.g., via client 110). Client 110 may select a web page URL from URL list 420, and may invoke a browser application (e.g., web page browser application 320) to provide the selected web page URL to server 120 via a URL request 430. URL request 430 may include a request to access one or more web pages associated with the selected web page URL. Server 120 may provide a web page 440 associated with the selected web page URL, and client 110 may receive web page 440. As server 120 provides web page 440 to client 110, client 110 may derive web page download performance information 450 associated with web page 440. Web page download performance information 450 may include web page download response time, inline object response times, inline object throughputs (e.g., in bits per second), round trip times of TCP handshakes associated with inline objects, round trip times of HTTP GET requests associated with inline objects, a number or retransmissions from server 120 to client 110, a cumulative sum of response times of DNS queries associated with a web page transaction, etc.

Client 110 may utilize web page download performance information 450 to calculate web page download performance statistics 460. As shown in FIG. 4, client 110 may provide web page download performance statistics 460 to user 410. User 410 may utilize web page download performance statistics 460 to determine whether server 120 (and/or network 130) is providing services (e.g., web pages for download) in an optimal manner. Web page download performance statistics 460 may include web page level, TCP connection level, and/or inline object level statistics. Client 110 may concatenate the web page, TCP connection, and inline object level statistics to output files, and may determine if there are unselected URLs in URL list 420. If there are unselected URLs in URL list 420, client 110 may select a next web page URL from URL list 420 and may repeat the aforementioned process. If there are no unselected (i.e., remaining) URLs in URL list 420, client 110 may provide the output files to user 410 and/or a device associated with user 410.

Although FIG. 4 shows exemplary components of network portion 400, in other implementations, network portion 400 may contain fewer, different, or additional components than depicted in FIG. 4. In still other implementations, one or more components of network portion 400 may perform one or more other tasks described as being performed by one or more other components of network portion 400. For example, client 110 may utilize a parameter that defines a time interval between reading URLs in URL list 420. Since web pages may be provided to client 110 at different rates, the time interval parameter may be set to provide client 110 enough time to read a URL and monitor a web page (e.g., associated with the URL) prior to selecting a next URL in URL list 420.

Figure 5:
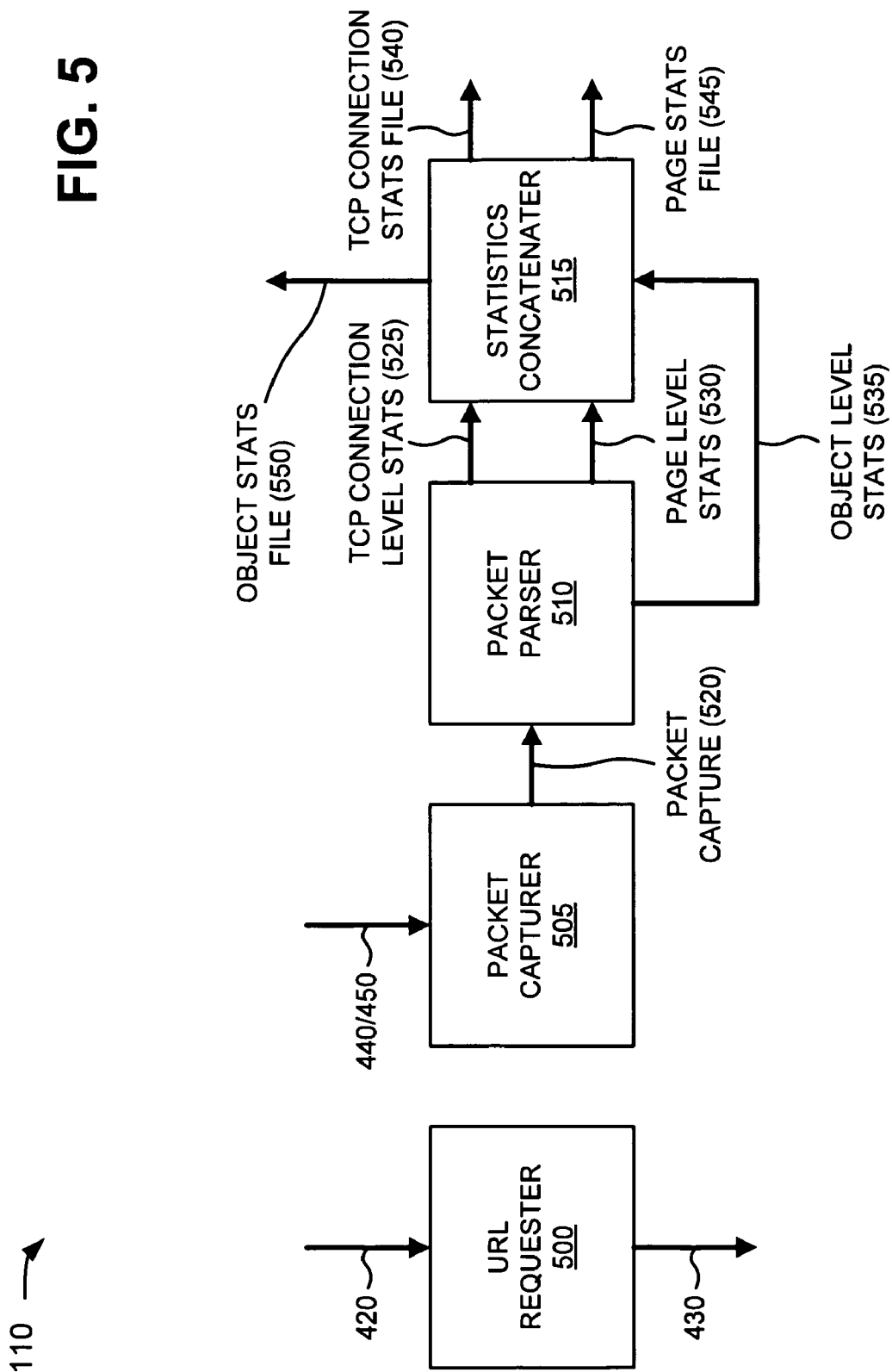
FIG. 5 depicts a diagram of exemplary functional components of the client illustrated in FIG. 1.

FIG. 5 depicts a diagram of exemplary functional components of client 110. As shown, client 110 may include a URL requester 500, a packet capturer 505, a packet parser 510, and/or a statistics concatenater 515. In one implementation, the functions described in connection with FIG. 5 may be performed by processing unit 220 (FIG. 2), and may provide what is referred to herein as the web page response monitoring tool.

URL requester 500 may include any hardware, software, or combination of hardware and software that may receive URL list 420 from user 410 or from another source, may select a web page URL from URL list 420, and may invoke a browser application (e.g., web page browser application 320) to retrieve the selected web page URL from server 120 via URL request 430.

Packet capturer 505 may include any hardware, software, or combination of hardware and software that may receive web page 440, may begin a packet capture 520 (e.g., to capture packets) prior to URL requester generating URL request 430, and may derive web page download performance information 450 (e.g., based on packet capture 520). Packet capture 520 may collect packet data associated with web page 440 and web page download performance information 450 may be derived from the collected packet data. In one exemplary implementation, packet capture 520 may collect packet data for packets associated with HTTP and/or DNS protocol that may be sent from and/or received by client 110. Packet capturer 505 may include a packet capture program installed on client 110. The packet capture program may analyze and store incoming packets. In one example, the packet capture program may include an open source routine, such as a TCP dump, a packet capture (PCAP) library derivative, etc. A TCP dump may execute as a command line executable if the web page response monitoring tool is implemented as a command line script. Packet capturer 505 may wait a configurable period of time, to allow the web page download to complete, prior to ceasing packet capture 520. In one implementation packet capture 520 may be captured for an Ethernet link layer protocol. In other implementations, packet capture 520 may be captured for other link layer protocols such as asynchronous transfer mode (ATM), frame relay, etc. In still other implementations, packet capturer 505 may start packet capture 520 with filters set to capture HTTP and DNS packets provided to and/or received from server 120. As further shown in FIG. 5, packet capturer 505 may provide packet capture 520 to packet parser 510.

Packet parser 510 may include any hardware, software, or combination of hardware and software that may receive packet capture 520 from packet capturer 505, and may parse packet capture 520 to extract statistics at multiple levels. In one implementation, for example, packet parser 510 may parse packet capture 520 to extract TCP connection level statistics 525, page level statistics 530, and inline object level statistics 535. In other implementations, packet parser 510 may analyze each packet in packet capture 520, may extract relevant header information for each packet, and may infer web page statistics. As further shown in FIG. 5, packet parser 510 may provide TCP connection level statistics 525, page level statistics 530, and inline object level statistics 535 to statistics concatenater 515. Further details of packet parser 510, TCP connection level statistics 525, page level statistics 530, and inline object level statistics 535 are provided below in connection with, for example, FIGS. 6-8.

Statistics concatenater 515 may include any hardware, software, or combination of hardware and software that may receive TCP connection level statistics 525, page level statistics 530, and inline object level statistics 535 from packet parser 510, may concatenate (or append) TCP connection level statistics 525 to a TCP connection statistics output file 540, may concatenate page level statistics 530 to a page statistics output file 545, and may concatenate inline object level statistics 535 to an inline object statistics output file 550. Output files 540-550 may include files dedicated to storing statistics associated with the corresponding types of information received by statistics concatenater 515. Statistics concatenater 515 may provide TCP connection statistics output file 540, page statistics output file 545, and/or inline object statistics output file 550 to user 410 and/or a device associated with user 410. User 410 may utilize TCP connection statistics output file 540, page statistics output file 545, and/or inline object statistics output file 550 to determine whether server 120 (and/or network 130) is providing services (e.g., web pages for download) in an optimal manner.

Although not shown in FIG. 5, client 110 may, optionally, include a functional component that performs a configurable set of pings and/or trace routes to URLs provided in packet capture 520 and associated with web page 440. Such an arrangement may enable client 110 to obtain additional round trip time (RTT) information for each of the inline objects associated with web page 440. If there are unselected (i.e., remaining) URLs in URL list 420, URL requester 500 may select a next web page URL from URL list 420, and client 110 may repeat the aforementioned functions until there are no unselected URLs in URL list 420. If there are no unselected URLs in URL list 420, client 110 may close TCP connection statistics output file 540, page statistics output file 545, and/or inline object statistics output file 550, and may terminate the web page response monitoring tool.

In one exemplary implementation, client 110 may upload TCP connection statistics output file 540, page statistics output file 545, and/or inline object statistics output file 550 to a database (e.g., via a file transfer protocol (FTP) or other protocol) for further processing (e.g. data aggregation, trending, data mining, etc.). The ISP may utilize a backend system to determine individual and/or aggregate measures of web page download performance based on TCP connection statistics output file 540, page statistics output file 545, and/or inline object statistics output file 550. In one example, the backend system may calculate statistical measures (e.g., average, median, percentiles, etc.) for response times associated with web page download tests performed for a subscriber population, may calculate statistical measures or empirical distributions of inline object download response times for particular objects observed from a group (or region) of subscriber test locations, etc.

Although FIG. 5 shows exemplary functional components of client 110, in other implementations, client 110 may contain fewer, different, or additional functional components than depicted in FIG. 5. In still other implementations, one or more functional components of client 110 may perform one or more other tasks described as being performed by one or more other functional components of client 110.

Figure 6:
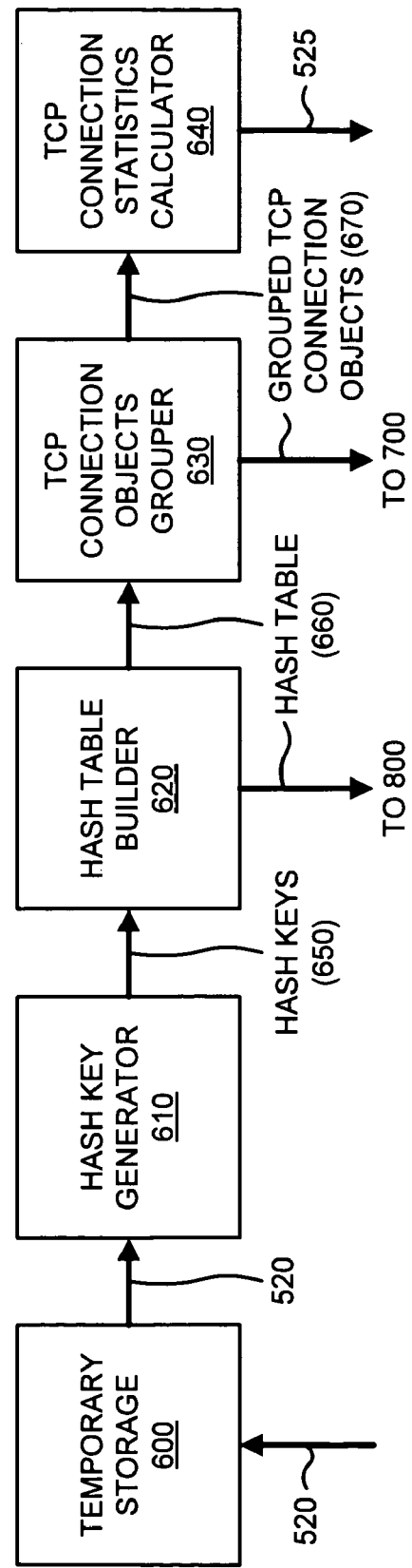
FIGS. 6-8 illustrate diagrams of exemplary functional components of a packet parser component depicted in FIG. 5.

FIG. 6 illustrates a diagram of exemplary functional components of packet parser 510. As shown, packet parser 510 may include temporary storage 600, a hash key generator 610, a hash table builder 620, a TCP connection objects grouper 630, and/or a TCP connection statistics calculator 640. In one implementation, the functions described in connection with FIG. 6 may be performed by processing unit 220 (FIG. 2).

Temporary storage 600 may include a temporary storage device (e.g., main memory 230, ROM 240, and/or storage device 250) that receives packet capture 520, and temporarily stores fields for each protocol layer header associated with each packet of packet capture 520. For example, temporary storage 600 may store an Ethernet header, an IP header, a TCP header, HTTP commands identified in HTTP packet payloads, a timestamp for each packet, etc. As further shown in FIG. 6, temporary storage 600 may provide packet capture 520 to hash key generator 610.

Hash key generator 610 may include any hardware, software, or combination of hardware and software that may receive packet capture 520 from temporary storage 600, and may generate hash keys 650 based on packet capture 520 (e.g., by parsing packet capture 520). Hash key generator 610 may use a hashing scheme to associate packets that belong to the same TCP connection. HTTP packets for which a source TCP port has a value of "80" may be defined as server-client directed packets (or "downstream" packets). HTTP packets for which a destination TCP port has a value of "80" may be defined as client-server directed packets (or "upstream" packets). For HTTP packets, the TCP port having value "80" may be referred to as a "serv_port" and a remaining TCP port may be referred to as "cli_port." An IP address corresponding to the serv_port may be referred to as "serv_ip_addr" and an IP address corresponding to the cli_port may be referred to as "cli_ip_addr." For each packet, a string value may be constructed that includes srv_ip_addr, cli_ip_addr, srv port, cli port, and a protocol type field obtained from the Ethernet header (e.g., where each component may be converted to and represented as a string). The string derived from the concatenation of the strings may be referred to as a hash key 650 (e.g., a TCP connection hash key). Hash key generator 610 may derive one of hash keys 650 from the five-tuple of IP address pairs, TCP port pairs, and Ethernet protocol type. As each packet is read from packet capture 520, hash key generator 610 may generate one of hash keys 650. As further shown in FIG. 6, hash key generator 610 may provide hash keys 650 to hash table builder 620.

Hash table builder 620 may include any hardware, software, or combination of hardware and software that may receive hash keys 650 from hash key generator 610, and may create a hash table 660 of TCP connection objects from hash keys 610. Hash table builder 620 may provide hash table 660 to TCP connection objects grouper 630 and/or to an inline object level statistics calculator 800 (described below in connection with FIG. 8). In one exemplary implementation, hash table builder 620 may use an object oriented programming language (e.g., Java, C++, C#, etc.) to define the TCP connection objects of hash table 660. For example, the TCP connection objects may include the following exemplary member variables:

upstreamPkts) by one. If the packet is a synchronization (SYN) packet associated with a TCP handshake, hash table builder 620 may set TcpSynTimestamp to the packet timestamp, may set a connection to an "Opening" state, and may set the TCP connection state to a "Closing" state. If the packet is a SYN acknowledgment (ACK) packet associated with a TCP handshake, hash table builder 620 may set TcpSynAckTimestamp to the packet timestamp. If the packet is a finish (FIN) packet associated with a TCP closing sequence, hash table builder 620 may set TcpFinTimestamp to the packet timestamp. If the packet is a FIN ACK packet associated with a TCP closing sequence, hash table builder 620 may set TcpConnClosedTimestamp to the packet timestamp. If a packet has a reset (RST) flag set in a TCP header, hash table builder 620 may set the TCP connection to an "Aborted" state and may set TcpConnClosedTimestamp to the packet timestamp. Upon detecting a first downstream (or upstream) data packet within a TCP connection object, following a TCP handshake, hash table builder 620 may set DownstreamStartTimestamp (or UpstreamStartTimestamp) to the packet timestamp. For each downstream (or upstream) data packet within a TCP connection object (e.g., having non-zero payloads), hash table builder 620 may update DownstreamEndTimestamp (or UpstreamEndTimestamp) with a timestamp of the current

```
// State Variables
char cli_ip_addr[4];        // each char stores an integer value for Ipv4 dot decimal notation
char srv_ip_addr[4];        // each char stores an integer value for Ipv4 dot decimal notation
unsigned short cli_port;    // client side TCP port
unsigned short srv_port;    // server side TCP port (decimal 80 for HTTP)
char state[10];             // "Unknown," "Opening." "Open," "Closing," "Closed," "Aborted"
// Statistics Variables
// HttP Specific Variables
unsigned long page_id;
list<HttpInlineObject> InlineObjList
// Byte and Pkt Count Variables
double upstreamBytes;       // number of upstream bytes measured for the connection
double downstreamBytes;     // number of downstream bytes measured for the connection
double upstreamPkts;        // number of upstream packets measured for the connection
double downstreamPkts;      // number of downstream packets measured for the connection
// Timestamp Variables
double TcpSynTimestamp;              // timestamp of TcpSYN packet
double TcpSynAckTimestamp;           // timestamp of TcpSYN_ACK packet
double TcpFinTimestamp;              // timestamp of TcpFIN packet
double TcpConnClosedTimestamp;       // timestamp of TcpFIN_Ack or TcpRST packet
double DownstreamStartTimestamp;     // timestamp of first downstream pkt of the conn
double DownstreamEndTimestamp;       // timestamp of last downstream pkt of the conn
double UpstreamStartTimestamp;       // timestamp of first upstream pkt of the conn
double UpstreamEndTimestamp;         // timestamp of last upstream pkt of the conn
// SeqNum and AckNum Derived Statistics
unsigned long DownstreamRetransmissions;   // number of downstream re-transmissions detected
unsigned long DownstreamOutOfOrders;       // number of downstream re-transmissions detected
unsigned long UpstreamRetransmissions;     // number of upstream re-transmissions detected
unsigned long UpstreamOutOfOrders;         // number of upstream re-transmissions detected.
```

In one implementation, hash table builder 620 may use the five-tuple (e.g., cli_ip_addr, srv_ip_addr, cli_port, srv_port, and Ethernet protocol type) to locate a TCP connection object in hash table 660. If a packet from packet capture 520 (e.g., as identified via one of hash keys 650) does not match a TCP connection object in hash table 660, hash table builder 620 may add a new TCP connection object to hash table 660, and may update member variables appropriately. If a packet from packet capture 520 (e.g., as identified via one of hash keys 650) matches a TCP connection object in hash table 660, hash table builder 620 may update the member variables in the following manner.

If the packet is determined to be a downstream (or an upstream) packet, hash table builder 620 may increment downstreamBytes (or upstreamBytes) by a payload size of the packet in bytes and may increment downstreamPkts (or packet so that DownstreamEndTimestamp (or UpstreamEndTimestamp) may ultimately get set to a final packet observed for that connection.

Hash table builder 620 may process sequence numbers of each packet to infer counts of packet re-transmissions and out-of-order packets within each TCP connection. Upon receiving each packet in a downstream direction for a given TCP connection, hash table builder 620 may set an expected sequence number for a next arriving packet to a sequence number of a current packet plus a payload size of the current packet. If a sequence number of the next arriving packet is less than this expected value, hash table builder 620 may increment DownstreamRetransmissions or UpstreamRetransmissions by one depending on whether the packet is a downstream packet or an upstream packet. If a sequence number of the next arriving packet is greater than the expected value, hash table builder 620 may increment DownstreamOutOfOrders or UpstreamOutOfOrders by one depending on whether the packet is a downstream packet or an upstream packet.

TCP connection objects grouper 630 may include any hardware, software, or combination of hardware and software that may receive hash table 660 of TCP connection objects from hash table builder 620, and may group TCP connection objects associated with the same web page. TCP connection objects grouper 630 may provide grouped TCP connection objects 670 to TCP connection statistics calculator 640 and/or to a start/end time definer 700 (described below in connection with FIG. 7).

pageDelineationThreshold, the latter TCP connection object may be provided a new page_id value (e.g., equal_to_page_id_cnt+1). TCP connection objects grouper 630 may use this process to set the page_id member variable of each TCP connection object such that TCP connection objects with the same page_id value may make up a group of TCP connection objects for a particular web page.

Each TCP connection object may contain an InlineObjList member variable. The InlineObjList member may be relevant for each TCP connection object qualifying as HTTP (e.g., that include srv_port of decimal 80). The InlineObjList may include a list of HttpInlineObjects, where each HttpInlineObject may include the following member variables:

```
// Fixed Variables
char cli_ip_addr[4];
char srv_ip_addr[4];
unsigned short cli_port;
unsigned short srv_port;
unsigned short resp_code;
unsigned long content_length;
char url[1510];
char referer[100];
char host[50];
char content_type[50];
// Statistics Variables
double upstreamBytes;         // number of upstream bytes measured for the inline object
double downstreamBytes;       // number of downstream bytes measured for the inline object
double upstreamPkts;          // number of upstream packets measured for the inline object
double downstreamPkts;        // number of downstream packets measured for the inline object
double GetTimestamp;          // timestamp of Get command
double ResponseStartTimestamp; // timestamp of ResponseStart
double ResponseEndTimestamp;   // timestamp of last packet of inline object.
```

In one exemplary implementation, TCP connection objects grouper 630 may identify TCP connection objects that include a common cli_ip_addr (or client host name), and may group the TCP connection objects by cli_ip_addr to generate grouped TCP connection objects 670. TCP connection objects grouper 630 may define separate lists of pointers to the TCP connection objects in hash table 660 by grouping the pointers to TCP connection objects that include a given cli_ip_addr into a separate list for each cli_ip_addr (or client host name). TCP connection objects grouper 630 may sort each list of TCP connection objects (associated with a cli_ip_addr) based on TcpSynTimestamp when the list is constructed or after the list is constructed. For each cli_ip_addr based TCP connection object list, TCP connection objects grouper 630 may assign a web page index value (e.g., page_id) to groups of TCP connection objects.

The web page index value for each TCP connection object may be assigned in the following manner. TCP connection objects grouper 630 may define a "page_id_cnt" value and may initialize the value to zero. For each cli_ip_addr, TCP connection objects grouper 630 may read the list of TCP connection pointers previously established. As each TCP connection object is read from the cli_ip_addr index list, TCP connection objects grouper 630 may set the page_id member variable of the TCP connection object to page_id_cnt. While reading the TCP connection objects for a given cli_ip_addr, TCP connection objects grouper 630 may define a variable (e.g., delta) that may be a difference between a TcpSynTimestamp of a current TCP connection object and a previous TCP connection object in the list. If delta is greater than a threshold value (e.g., pageDelineationThreshold), TCP connection objects grouper 630 may increment page_id_cnt by one (e.g., to indicate a page boundary). In other words, for a given cli_ip_addr, when two consecutively read TCP connection objects have a TcpSynTimestamp difference greater than The cli_ip_addr, srv_ip_addr, cli_port, and srv_port members of the HttpInlineObject may be the same as the cli_ip_addr, srv_ip_addr, cli_port, and srv_port members in the TCP connection object that contains that HttpInlineObject in its InlineObjList. The resp_code, content_length, url, referer, host, and content_type fields may include fields extracted from the HTTP packets which make up the HttpInlineObject. These values may be extracted from the HTTP commands identified in the packet payloads (e.g., for those packets that make up HttpInlineObject). For a given TCP connection object, TCP connection objects grouper 630 may instantiate a new HttpInlineObject, and may add the new HttpInlineObject to the InlineObjList (for the TCP connection object once a "GET" string is identified in the payload of a packet associated with the TCP connection object). Packets for the TCP connection object observed from that point (e.g., until a next "GET" string is identified) may be assumed to be packets that make up the current HttpInlineObject. If a packet is determined to be directed downstream (or upstream), TCP connection objects grouper 630 may increment downstreamBytes (or upstreamBytes) by a payload size of the packet and may increment downstreamPkts (or upstreamPkts) by one. GetTimestamp may include a timestamp of a GET packet for an HttpInlineObject (e.g., the packet that contains the "GET" string). ResponseStartTimestamp may include a timestamp of a first downstream packet arriving in response to the GET packet and ResponseEndTimestamp may include a timestamp of a last packet (e.g., of non-zero payload) received for the HttpInlineObject. GetRTT of an HttpInlineObject may be defined as a difference between ResponseStartTimestamp and the GetTimestamp for that TCP connection object.

TCP connection statistics calculator 640 may include any hardware, software, or combination of hardware and software that may receive grouped TCP connection objects 670 from TCP connection objects grouper 630, and may calculate TCP connection level statistics 525 based on grouped TCP connection objects 670. TCP connection level statistics 525 may include a list of TCP connection statistics for individual TCP connection objects (e.g., provided in grouped TCP connection objects 670). In one implementation, TCP connection level statistics 525 may include explicit TCP connection member variables or statistics derived from the TCP connection statistics member variables. In an exemplary implementation, TCP connection level statistics 525 may include statistics associated with one or more of the following TCP connection member variables:

--- page_id = page_id assigned to the TCP connection;
cli_ip_addr = client side IP address for the TCP connection;
srv_ip_addr = server side IP address for the TCP connection;
cli_port = client side TCP port;
srv_port = server side TCP port (generally port 80);
upstreamBytes = number of upstream bytes measured for the connection;
downstreamBytes = number of downstream bytes measured for the connection;
upstreamPkts = number of upstream packets measured for the connection;
downstreamPkts = number of downstream packets measured for the connection;
TcpSynTimestamp = timestamp of TCP Handshake TcpSYN packet;
TcpSynAckTimestamp = timestamp of TCP Handshake TcpSYN_ACK packet;
TcpFinTimestamp = timestamp of TCP connection closing TcpFIN packet;
DownstreamStartTimestamp = timestamp of first downstream data packet (with non-zero payload) of the TCP connection;
DownstreamEndTimestamp = timestamp of last downstream data packet (with non-zero payload) of the TCP connection;
UpstreamStartTimestamp = timestamp of first upstream data packet (with non-zero payload) of the TCP connection;
UpstreamEndTimestamp = timestamp of last upstream data packet (with non-zero payload) of the TCP connection;
DownstreamRetransmissions = number of downstream re-transmissions detected in the TCP connection; and/or
DownstreamOutOfOrders = number of downstream out-of-order packets detected in the TCP connection.

---

Figure 7:
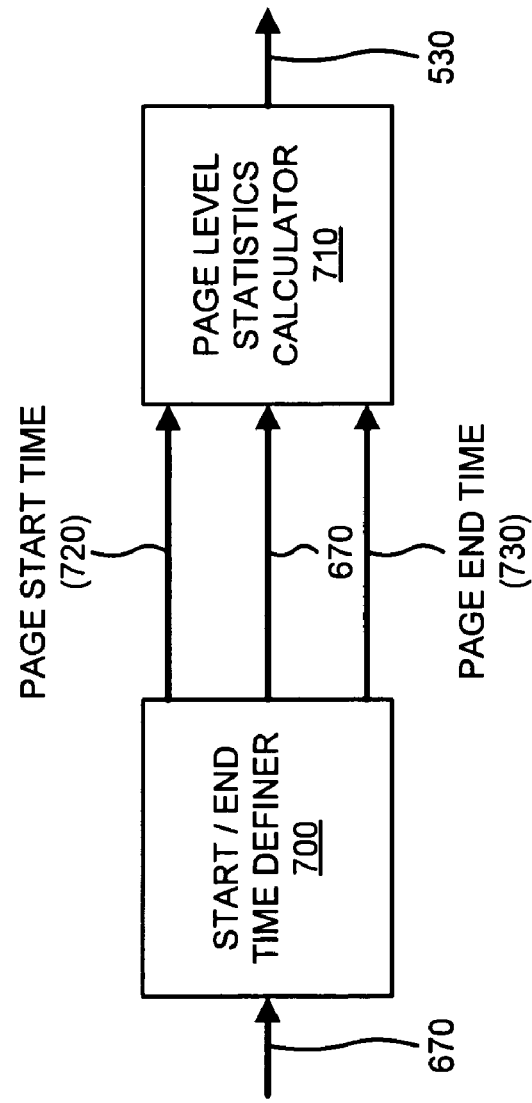

FIG. 7 illustrates a diagram of additional exemplary functional components of packet parser 510. As shown, packet parser 510 may include a start/end time definer 700 and/or a page level statistics calculator 710. In one implementation, the functions described in connection with FIG. 7 may be performed by processing unit 220 (FIG. 2).

Start/end time definer 700 may include any hardware, software, or combination of hardware and software that may receive grouped TCP connection objects 670 from TCP connection objects grouper 630 (FIG. 6). For a web page (e.g., grouped TCP connection objects 670 that include the same page_id), start/end time definer 700 may define a page start time 720 as Min(TcpSynTimestamp) for TCP connection objects that make up the web page, and may define a page end time 730 as Max(ResponseEndTimestamp) for HttpInlineObjects that make up the web page. Start/end time definer 700 may provide page start time 720 and page end time 730 to page level statistics calculator 710.

Page level statistics calculator 710 may include any hardware, software, or combination of hardware and software that may receive grouped TCP connection objects 670, page start time 720, and page end time 730 from start/end time definer 700, and may calculate page level statistics 530 based on the received information. In one exemplary implementation, page level statistics calculator 710 may calculate the following page level statistics 530 for each web page:

--- page_id = value assigned to set of TCP connection objects that are grouped as a page;
pageObjects = sum of inline objects in the TCP connection objects assigned a common page_id;
pageDownstreamRetransmissions = sum of DownstreamRetransmission in the TCP connection objects assigned to a common page_id;
pageOutOfOrders = sum of DownstreamOutOfOrders in the TCP connection objects assigned to a common page_id;
pageTcpSynTimestamp = the minimum TcpSynTimestamp for the TCP connection objects assigned to a common page_id;
pageDownstreamEndTimestamp = the maximum DownstreamEndTimestamp for the HttpInlineObjects associated with the set of TCP connection objects assigned common page_id;
pageResponseTime = pageDownstreamEndTimestamp − pageTcpSynTimestamp;
pageObjectsResponseTimesSum = the sum of response time for the HttpInlineObjects associated with the set of TCP connection objects assigned common page_id;
pageResonseIdleTime = pageResponseTime − pageObjectsResponseTimesSum;
pageDownstreamBytes = sum of downstream bytes for the TCP connection objects assigned to a common page_id;
pageResponseThroughput = 8*pageDownstreamBytes/pageResponseTime;
TcpHandshakeRTTxxx = xxx TcpHandshakeRTT (Note: TcpHandshakeRTTxxx = TcpSendAckTimestamp − TcpSendTimestamp) for the TCP connection objects assigned to a common page_id;
GetRTTxxx = xxx GetRTT value (Note: GetRTT = ResponseStartTimestamp − GetTimestamp) for the HttpInlineObjects associated with the set of TCP connection objects assigned common page_id; and/or
ObjectResponseThroughputxxx = xxx Response Throughput value for the HttpInlineObjects associated with the set of TCP connections assigned common page_id, where "xxx" may be a minimum, a maximum, a mean, a median, or any other statistic.

Figure 8:
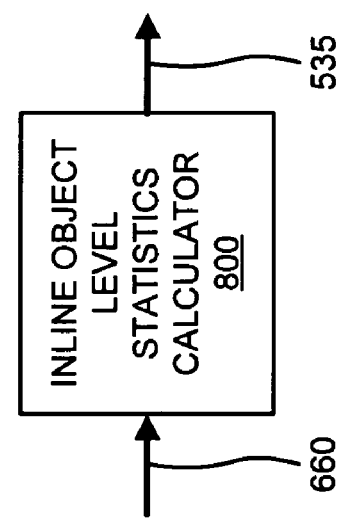

FIG. 8 illustrates a diagram of another exemplary functional component of packet parser 510. As shown, packet parser 510 may include inline object statistics calculator 800. In one implementation, the functions described in connection with FIG. 8 may be performed by processing unit 220 (FIG. 2).

Inline object statistics calculator 800 may include any hardware, software, or combination of hardware and software that may receive hash table 660 from hash table builder 620 (FIG. 6), and may calculate inline object level statistics 535 based on hash table 660. Inline object level statistics 535 may include statistics attributed to HttpInlineObjects, such as HttpInlineObject statistics derived from the HttpInlineObject member variables. In one exemplary implementation, inline object statistics calculator 800 may calculate the following inline object level statistics 535:

cli_ip_addr = client side IP address for the TCP connection object;
srv_ip_addr = server side IP address for the TCP connection object;
cli_port = client side TCP port;
srv_port = server side TCP port (generally port 80);
resp_code = response code returned in the ResponseStart packet;
content_length = value in content length field of the HTTP GET request;
url = value of url string in the HTTP GET request;
referer = value of referer field in the HTTP GET request;
host = value of host field in the response start packet;
content_type = value of content type field in the ResponseStart packet;
upstreamBytes = number of upstream bytes measured for the inline object;
downstreamBytes = number of downstream bytes measured for the inline object;
upstreamPkts = number of upstream packets measured for the inline object;
downstreamPkts = number of downstream packets measured for the inline object;
GetTimestamp = timestamp of GET request packet;
ResponseStartTimestamp = timestamp of ResponseStart packet;
ResponseEndTimestamp = timestamp of last packet of inline object with non-zero payload;
GetRTT = ResponseStartTimestamp − GetTimestamp;
DownstreamRetransmissions = number of downstream re-transmissions detected in the inline object; and/or
DownstreamOutOfOrders = number of downstream out-of-order packets detected in the inline object.

Although FIGS. 6-8 show exemplary functional components of packet parser 510, in other implementations, packet parser 510 may contain fewer, different, or additional functional components than depicted in FIGS. 6-8. In still other implementations, one or more functional components of packet parser 510 may perform one or more other tasks described as being performed by one or more other functional components of packet parser 510.

Figure 9:
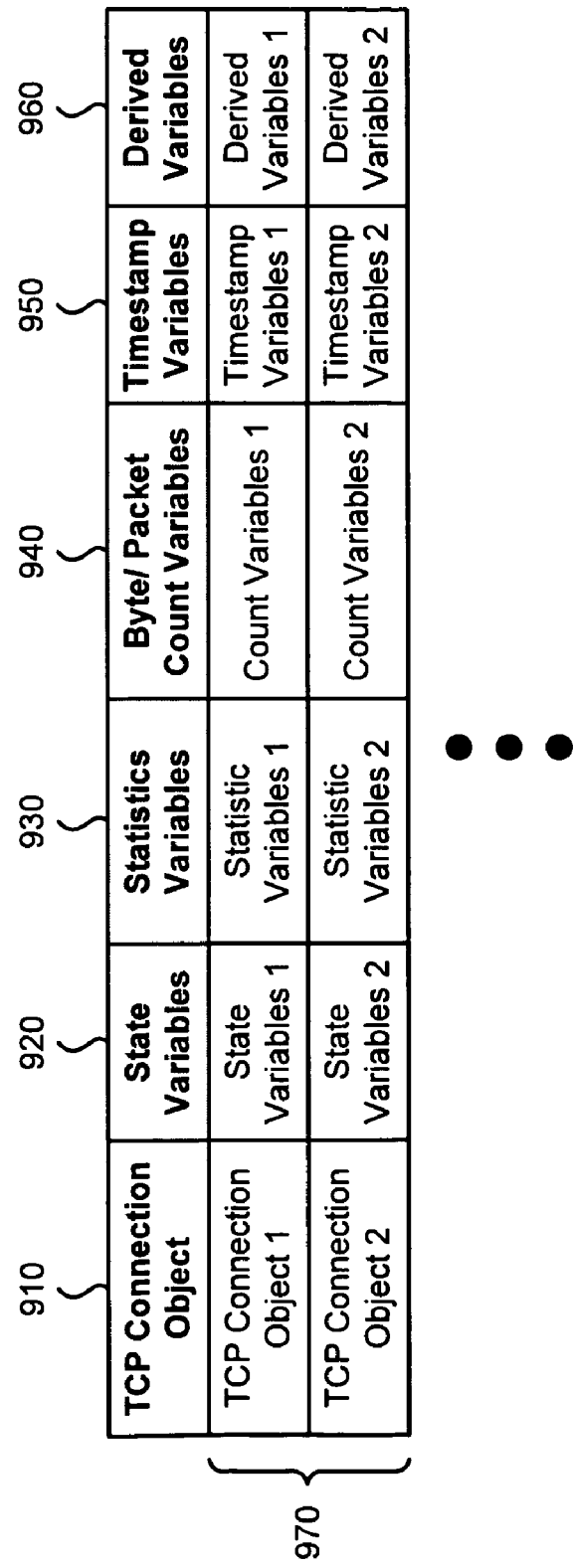
FIG. 9 depicts a diagram of a portion of an exemplary hash table capable of being provided in and/or generated by the client illustrated in FIG. 1.

FIG. 9 depicts a diagram of a portion 900 of an exemplary hash table capable of being provided in and/or generated by client 110. As illustrated, hash table portion 900 may include a TCP connection object field 910, a state variables field 920, a statistics variables field 930, a byte/packet count variables field 940, a timestamp variables field 950, a derived variables field 960, and entries 970 associated with fields 910-960.

TCP connection object field 910 may include identifiers associated with TCP connection objects derived from hash keys 610 (FIG. 6) (e.g., one or more five-tuples of IP address pairs, TCP port pairs, and Ethernet protocol type). For example, TCP connection object field 910 may include entries for "TCP Connection Object 1," "TCP Connection Object 2," etc.

State variables field 920 may include entries 970 that provide state variables (e.g., char cli_ip_addr[4], char srv_ip_addr[4], unsigned short cli_port, unsigned short srv_port, char state[10], etc.) associated with the TCP connection objects provided in TCP connection object field 910. For example, state variables field 920 may include entries 970 for "State Variables 1," "State Variables 2," etc.

Statistics variables field 930 may include entries 970 that provide statistics variables (e.g., unsigned long page_id, list<HttpInlineObject> InlineObjList, etc.) associated with the TCP connection objects provided in TCP connection object field 910. For example, statistics variables field 930 may include entries 970 for "Statistics Variables 1," "Statistics Variables 2," etc.

Byte/packet count variables field 940 may include entries 970 that provide byte and/or packet count variables (e.g., double upstreamBytes, double downstreamBytes, double upstreamPkts, double downstreamPkts, etc.) associated with the TCP connection objects provided in TCP connection object field 910. For example, byte/packet count variables field 940 may include entries 970 for "Count Variables 1," "Count Variables 2," etc.

Timestamp variables field 950 may include entries 970 that provide timestamp variables (e.g., double TcpSynTimestamp, double TcpSynAckTimestamp, double TcpFinTimestamp, double TcpConnClosedTimestamp, double DownstreamStartTimestamp, double DownstreamEndTimestamp, double UpstreamStartTimestamp, double UpstreamEndTimestamp, etc.) associated with the TCP connection objects provided in TCP connection object field 910. For example, timestamp variables field 950 may include entries 970 for "Timestamp Variables 1," "Timestamp Variables 2," etc.

Derived variables field 960 may include entries 970 that provide derived variables (e.g., unsigned long Downstream- Retransmissions, unsigned long DownstreamOutOfOrders, unsigned long UpstreamRetransmissions, unsigned long UpstreamOutOfOrders, etc.) associated with the TCP connection objects provided in TCP connection object field 910. For example, derived variables field 960 may include entries 970 for "Derived Variables 1," "Derived Variables 2," etc.

Although FIG. 9 shows exemplary information that may be provided in hash table portion 900, in other implementations, hash table portion 900 may contain fewer, different, or additional information than depicted in FIG. 9.

Figure 10:
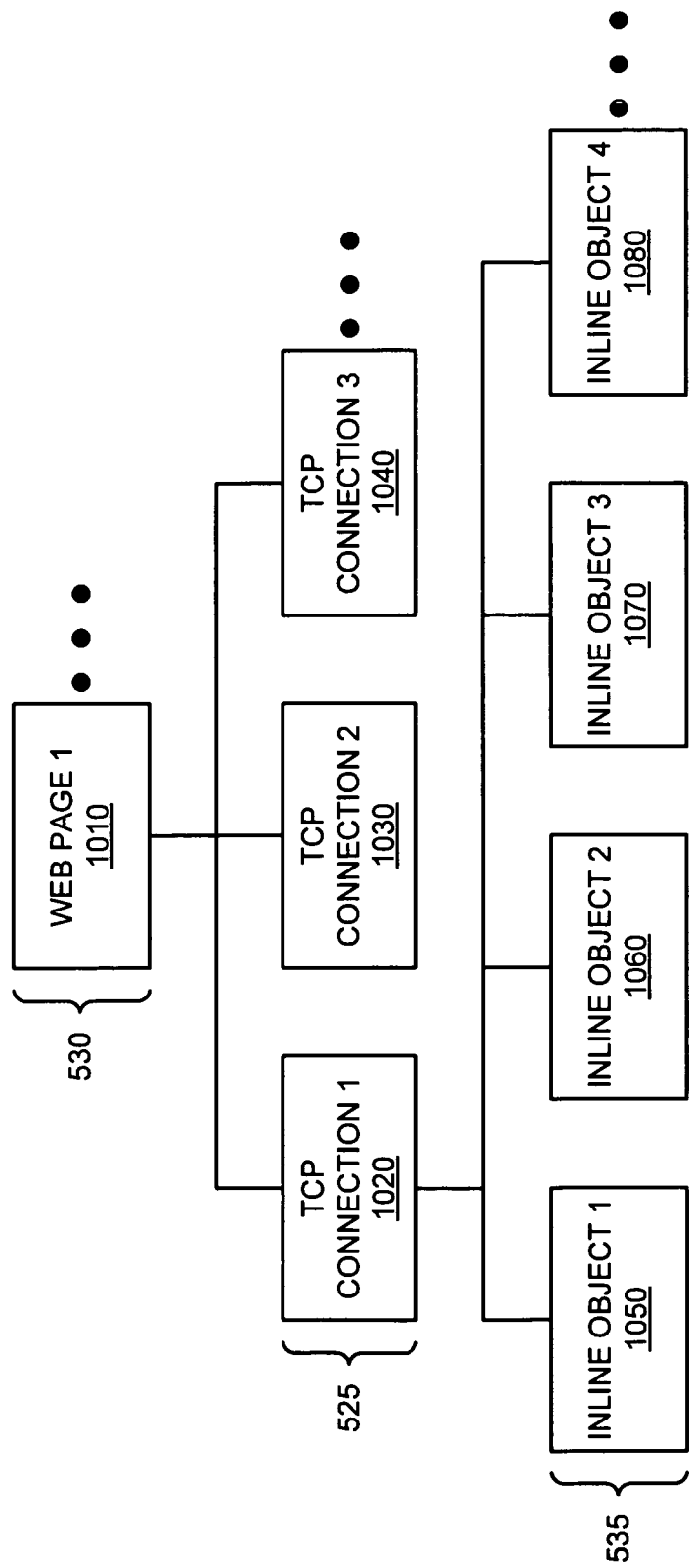
FIG. 10 illustrates a diagram of exemplary statistics capable of being provided in and/or generated by the client depicted in FIG. 1.

FIG. 10 illustrates a diagram of exemplary statistics 1000 capable of being provided in and/or generated by client 110. As shown, exemplary statistics 1000 may include TCP connection level statistics 525, page level statistics 530, and inline object level statistics 535.

As further shown in FIG. 10, page level statistics 530 may include web page level summary statistics for a first web page (WEB PAGE 1) 1010. First web page 1010 may be associated with a first TCP connection object (TCP CONNECTION 1) 1020, a second TCP connection object (TCP CONNECTION 2) 1030, and a third TCP connection object (TCP CONNECTION 3) 1040. TCP connection objects 1020-1040 may be provided in TCP connection level statistics 525. First TCP connection object 1020 may be associated with a first inline object (INLINE OBJECT 1) 1050, a second inline object (INLINE OBJECT 2) 1060, a third inline object (INLINE OBJECT 3) 1070, and a fourth inline object (INLINE OBJECT 4) 1080. Inline objects 1050-1080 may be provided in inline object level statistics 535.

Although FIG. 10 shows a single web page (e.g., first web page 1010), three TCP connection objects (e.g., TCP connection objects 1020-1040), and four inline objects (e.g., inline objects 1050-1080), in other implementations, exemplary statistics 1000 may include fewer, different, or additional web pages, TCP connection objects, and/or inline objects than depicted in FIG. 10. In still other implementations, additional TCP connection level statistics 525, page level statistics 530, and inline object level statistics 535 may be arranged in the manner depicted in FIG. 10.

FIGS. 11-14 depict flow charts of an exemplary process 1100 for monitoring web page response according to implementations described herein. In one implementation, process 1100 may be performed by client 110. In another implementation, some or all of process 1100 may be performed by another device or group of devices, including or excluding client 110.

Figure 11:
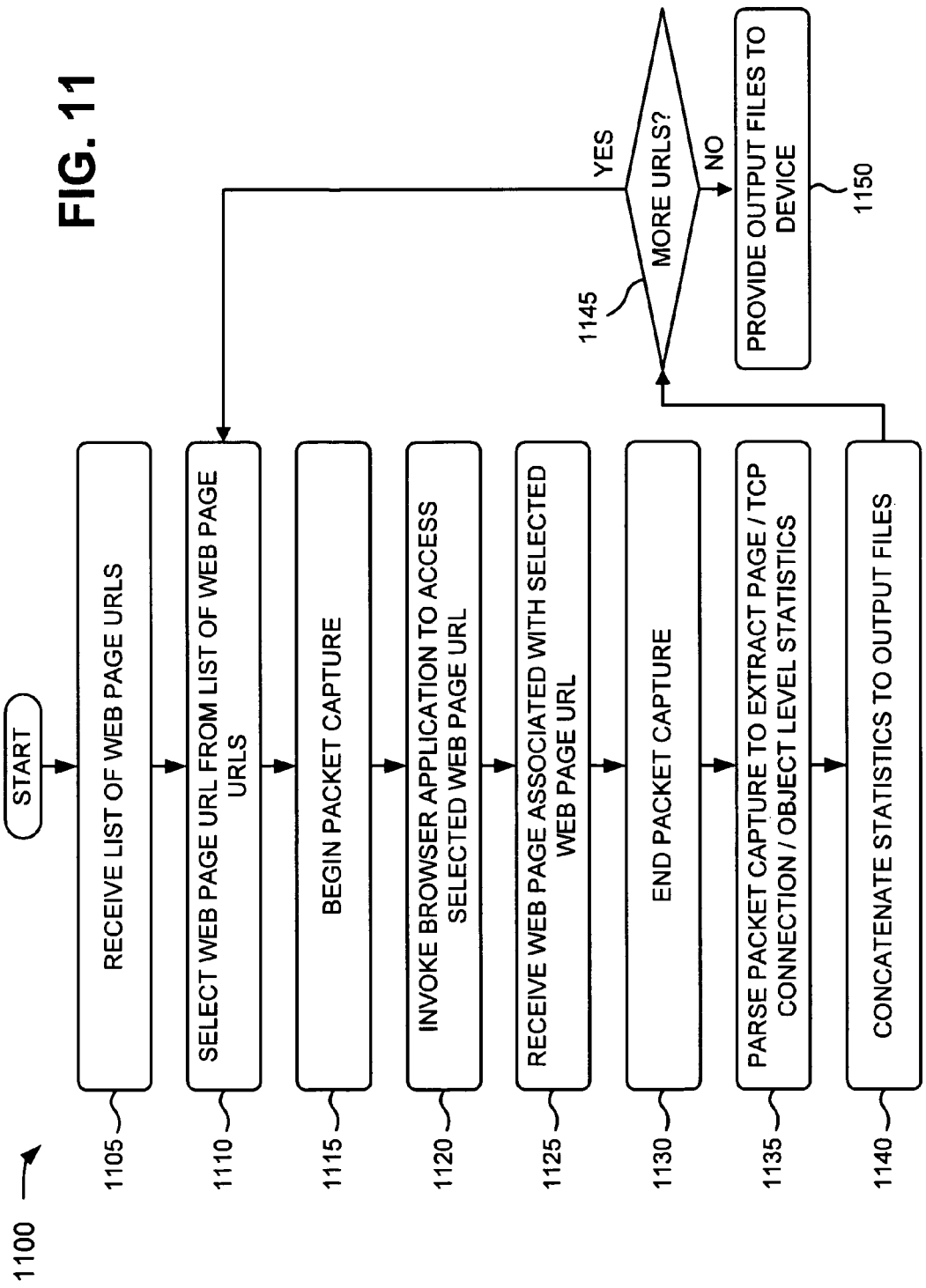
FIGS. 11-14 depict flow charts of an exemplary process for monitoring web page response according to implementations described herein.

As illustrated in FIG. 11, process 1100 may begin with receipt of a list of web page URLs (block 1105), and selection of a web page URL from the list of web page URLs (block 1110). For example, in implementations described above in connection with FIG. 4, client 110 may receive URL list 420 (e.g., from user 410 or from another source). URL list 420 may include a file that maintains a list of web page URLs to be visited in a sequence (e.g., via client 110). Client 110 may select a web page URL from URL list 420.

As further shown in FIG. 11, a packet capture may begin (block 1115), a browser application may be invoked to access the selected web page URL (block 1120), and a web page associated with the selected web page URL may be received (block 1125). For example, in implementations described above in connection with FIGS. 4 and 5, client 110 may include packet capturer 505. Packet capturer 505 may receive web page 440 and may begin packet capture 520 prior to URL requester generating URL request 430. Packet capture 520 may collect packet data associated with web page 440. Client 110 may invoke a browser application (e.g., web page browser application 320) to provide the selected web page URL to server 120 via URL request 430. URL request 430 may include a request to access one or more web pages associated with the selected web page URL. Server 120 may provide web page 440 associated with the selected web page URL, and client 110 may receive web page 440.

Returning to FIG. 11, the packet capture may end (block 1130), the packet capture may be parsed to extract page level statistics, TCP connection level statistics, and/or inline object level statistics (block 1135), and the statistics may be concatenated to output files (block 1140). For example, in implementations described above in connection with FIG. 5, client 110 may include packet capturer 505, packet parser 510, and statistics concatenater 515. Packet capturer 505 may wait a configurable period of time, to allow the web page download to complete, prior to ceasing packet capture 520. Packet parser 510 may receive packet capture 520 from packet capturer 505, and may parse packet capture 520 to extract statistics at multiple levels. In one example, packet parser 510 may parse packet capture 520 to extract TCP connection level statistics 525, page level statistics 530, and inline object level statistics 535. Statistics concatenater 515 may receive TCP connection level statistics 525, page level statistics 530, and inline object level statistics 535 from packet parser 510, may concatenate (or append) TCP connection level statistics 525 to a TCP connection statistics output file 540, may concatenate page level statistics 530 to a page statistics output file 545, and may concatenate inline object level statistics 535 to an inline object statistics output file 550. The concatenation of output files 540-550 may occur after the web page URLs from URL list 420 have been selected.

As further shown in FIG. 11, if it is determined that more unselected URLs exist in the list of web page URLs (block 1145—YES), process 1100 may return to block 1110 (e.g., for selection of another web page URL from the list of web page URLs). Otherwise (block 1145—NO), the output files may be provided to a device (block 1150). For example, in implementations described above in connection with FIG. 5, if there are unselected URLs in URL list 420, URL requester 500 of client 110 may select a next web page URL from URL list 420, and client 110 may repeat the aforementioned functions until there are no unselected URLs in URL list 420. If there are no unselected URLs in URL list 420, client 110 may close TCP connection statistics output file 540, page statistics output file 545, and/or inline object statistics output file 550, and may terminate the web page response monitoring tool. Statistics concatenater 515 of client 110 may provide TCP connection statistics output file 540, page statistics output file 545, and/or inline object statistics output file 550 to user 410 and/or a device associated with user 410. Client 110 may upload TCP connection statistics output file 540, page statistics output file 545, and/or inline object statistics output file 550 to a database (e.g., via a FTP or other protocol) for further processing (e.g. data aggregation, trending, data mining, etc.).

Figure 12:
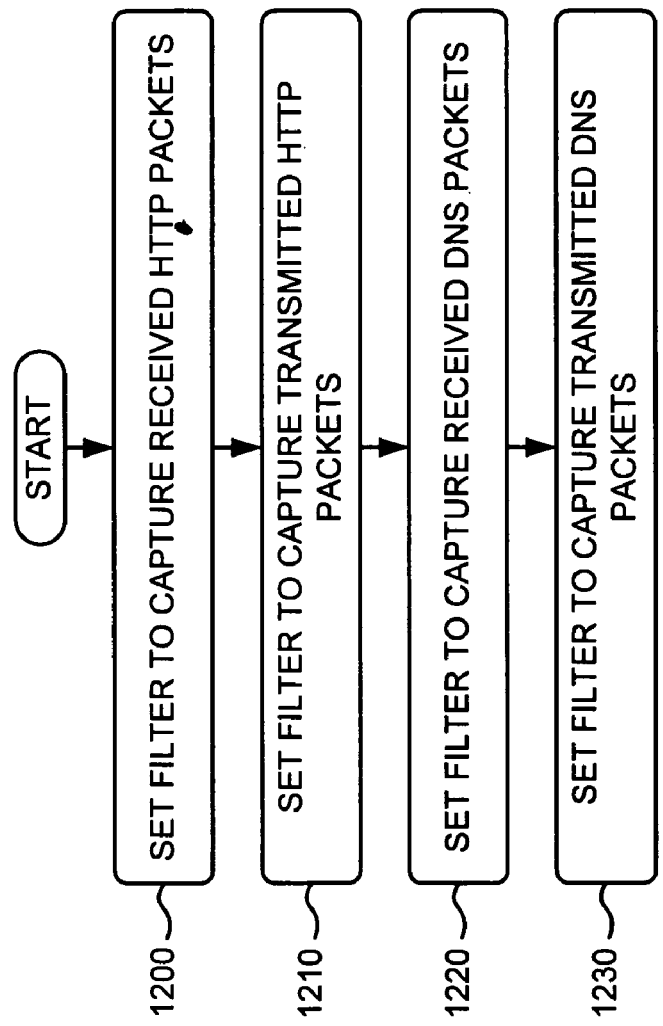

Process block 1115 may include the process blocks depicted in FIG. 12. As shown in FIG. 12, process block 1115 may include setting a filter to capture received HTTP packets (block 1200), setting a filter to capture transmitted HTTP packets (block 1210), setting a filter to capture received DNS packets (block 1220), and/or setting a filter to capture transmitted DNS packets (block 1230). For example, in implementations described above in connection with FIG. 5, packet capturer 505 of client 110 may start packet capture 520 with filters set to capture HTTP and DNS packets provided to and/or received from server 120.

Figure 13:
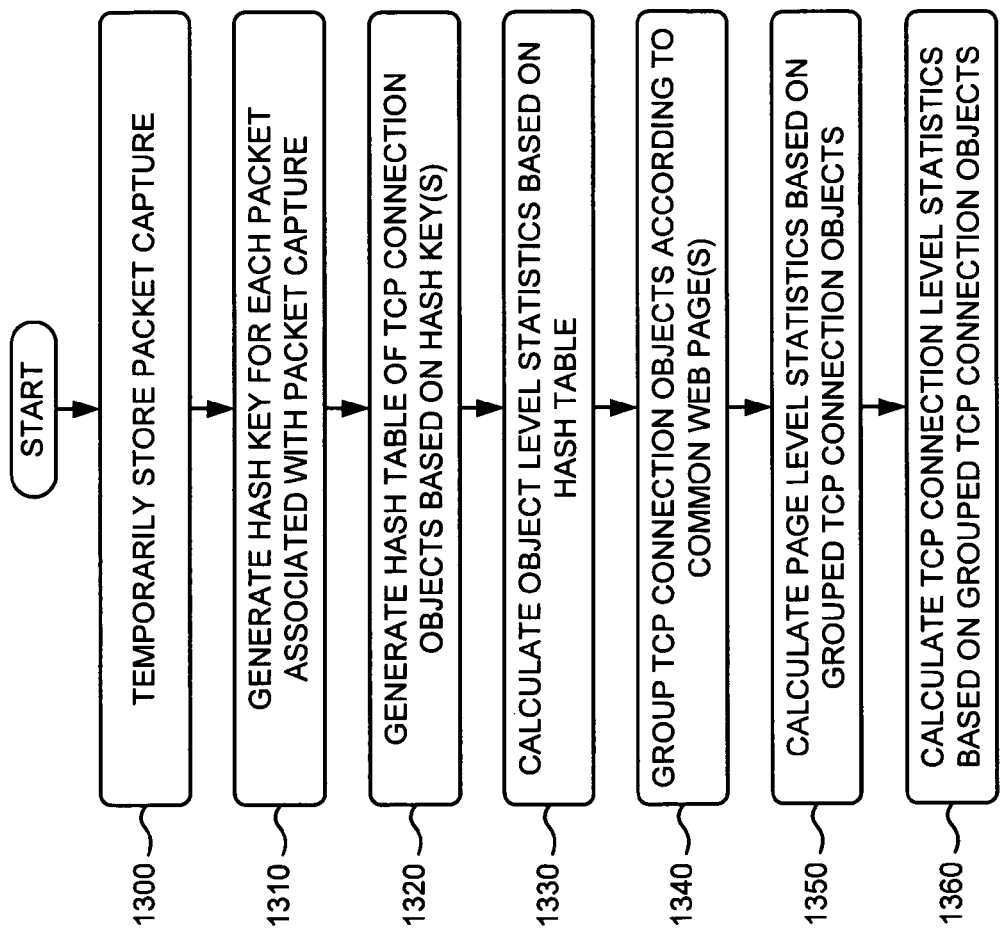

Process block 1135 may include the process blocks depicted in FIG. 13. As shown in FIG. 13, process block 1135 may include temporarily storing the packet capture (block 1300), stepping the capture file to read each packet, generating a hash key for each packet associated with the packet capture (block 1310), and generating a hash table of TCP connection objects based on the hash key(s) (block 1320). For example, in implementations described above in connection with FIG. 6, temporary storage 600 of client 110 may receive packet capture 520, and may temporarily store fields for each protocol layer header associated with each packet of packet capture 520. Hash key generator 610 of client 110 may generate hash keys 650 for each packet in packet capture 520 (e.g., by parsing packet capture 520). Hash key generator 610 may derive one of hash keys 650 from the five-tuple of IP address pairs, TCP port pairs, and Ethernet protocol type. As each packet is read from packet capture 520, hash key generator 610 may generate one of hash keys 650. Hash table builder 620 of client 110 may receive hash keys 650 from hash key generator 610, and may create hash table 660 of TCP connection objects from hash keys 610.

As further shown in FIG. 13, process block 1135 may include calculating the inline object level statistics based on the hash table (block 1330), grouping the TCP connection objects of the hash table according to common web page(s) (block 1340), calculating the page level statistics based on the grouped TCP connection objects (block 1350), and calculating the TCP connection level statistics based on the grouped TCP connection objects (block 1360). For example, in implementations described above in connection with FIGS. 6-8, hash table builder 620 of client 110 may provide hash table 660 to TCP connection objects grouper 630 and/or to inline object level statistics calculator 800 of client 110. Inline object statistics calculator 800 may receive hash table 660 from hash table builder 620, and may calculate inline object level statistics 535 based on hash table 660. TCP connection objects grouper 630 may receive hash table 660 of TCP connection objects from hash table builder 620, and may group TCP connection objects associated with the same web page. TCP connection objects grouper 630 may provide grouped TCP connection objects 670 to TCP connection statistics calculator 640 and/or to page level statistics calculator 710 (e.g., via start/end time definer 700) of client 110. TCP connection statistics calculator 640 may receive grouped TCP connection objects 670 from TCP connection objects grouper 630, and may calculate TCP connection level statistics 525 based on grouped TCP connection objects 670. Page level statistics calculator 710 may receive grouped TCP connection objects 670, page start time 720, and page end time 730 from start/end time definer 700, and may calculate page level statistics 530 based on the received information.

Figure 14:
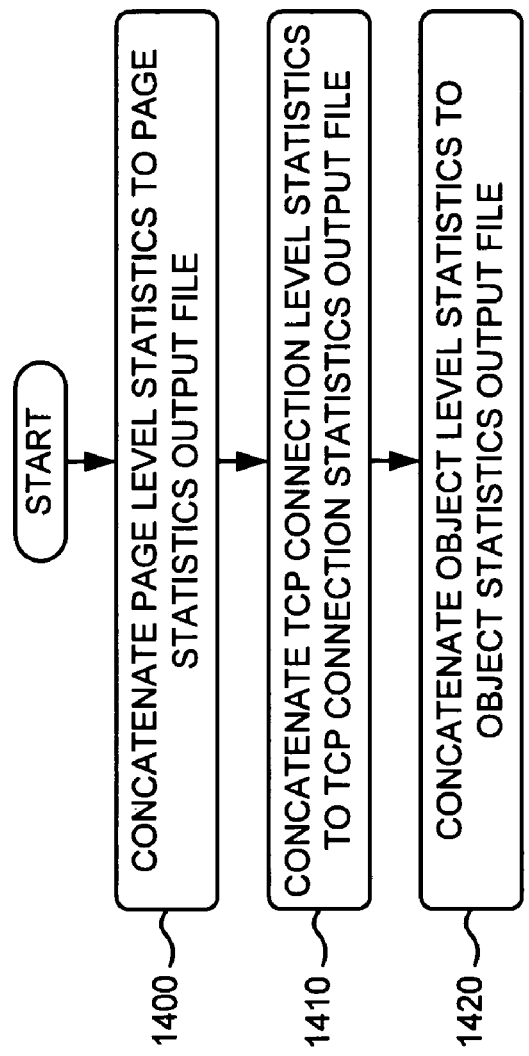

Process block 1140 may include the process blocks depicted in FIG. 14. As shown in FIG. 14, process block 1140 may include concatenating the page level statistics to a page statistics output file (block 1400), concatenating the TCP connection level statistics to a TCP connection statistics output file (block 1410), and concatenating the inline object level statistics to an inline object statistics output file (block 1420). For example, in implementations described above in connection with FIG. 5, statistics concatenater 515 of client 110 may receive TCP connection level statistics 525, page level statistics 530, and inline object level statistics 535 from packet parser 510, may concatenate (or append) TCP connection level statistics 525 to TCP connection statistics output file 540, may concatenate page level statistics 530 to page statistics output file 545, and may concatenate inline object level statistics 535 to inline object statistics output file 550.

Systems and/or methods described herein may provide a web page response monitoring tool. The web page response monitoring tool may simulate behavior of a web browsing session (e.g., by a client associated with a user) by automating a sequence of web page downloads, and may measure a range of statistics for the sequence of web page downloads at a web page level, a connection level, and/or an inline object level.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 11-14, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A network device-implemented method, comprising
  requesting, via a browser application of the network device, content associated with a web page;
  capturing, by the network device, first data associated with requesting the content associated with the web page and second data associated with receiving the content associated with the web page, where capturing the first data and the second data includes:
    setting a filter to capture received hypertext transfer protocol (HTTP) packets,
    setting a filter to capture transmitted HTTP packets,
    setting a filter to capture received domain name service (DNS) packets, and
    setting a filter to capture transmitted DNS packets;
  deriving, by the network device while receiving the content associated with the web page, performance information associated with capturing the first data and the second data, the derived performance information including download performance information associated with the webpage;
  parsing the derived performance information to extract statistics associated with requesting the content and statistics associated with receiving the content; and storing, by the network device, information associated with the derived performance information to a memory associated with the network device.

2. The network device-implemented method of claim 1, where the network device comprises a client device, and where capturing the first data and the second data further includes:
performing a set of pings or trace routes to uniform resource locators (URLs) associated with the web page to obtain round trip time information associated with each of a plurality of inline objects associated with the web page.

3. The network device-implemented method of claim 1, further comprising:
requesting, via the browser application, other content associated with another web page;
capturing third data associated with requesting the other content associated with the other web page and fourth data associated with receiving the other content associated with the other web page;
deriving, while receiving the other content associated with the other web page, other performance information associated with capturing the third data and the fourth data;
storing other information associated with the derived other performance information to the memory; and
providing the stored information, including the information associated with the derived performance information and the other information associated with the other derived performance information, to another network device.

4. The network device-implemented method of claim 1, where the download performance information comprises one or more of:
a web page download response time,
inline object response times,
inline object throughputs,
round trip times of transport control protocol (TCP) handshakes associated with inline objects,
round trip times of hypertext transfer protocol (HTTP) GET requests associated with inline objects,
a number or retransmissions to the computing device, or
a cumulative sum of response times of domain name service (DNS) queries associated with a web page transaction.

5. The network device-implemented method of claim 1, where capturing the first data and the second data further comprises one or more of:
setting, prior to requesting the content associated with the web page, the filter to capture received hypertext transfer protocol (HTTP) packets;
setting, prior to requesting the content associated with the web page, the filter to capture transmitted HTTP packets;
setting, prior to requesting the content associated with the web page, the filter to capture received domain name service (DNS) packet; or
setting, prior to requesting the content associated with the web page, the filter to capture transmitted DNS packets.

6. The network device-implement method of claim 1, where the first data associated with requesting the content and the second data associated with receiving the content comprises a plurality of packets, and parsing the derived performance information further comprises:
temporarily storing the plurality of packets;
generating a hash key for each packet, of the plurality of packets;
generating a has key of transport control protocol (TCP) connection objects based on the hash keys;
calculating the inline object level statistics based on the hash table;
grouping the TCP connection objects of the hash table according to common web pages;
calculating the page level statistics based on the grouped TCP connection objects;
and
calculating the connection level statistics based on the grouped TCP connection objects.

7. The computing device-implemented method of claim 1, where storing the information associated with the derived performance information comprises:
storing page level statistics to a page statistics output file;
storing connection level statistics to a connection statistics output file; and
storing inline object level statistics to an inline object statistics output file.

8. A device, comprising:
a memory to store a plurality instruction; and
a processor to execute one or more of the plurality of instructions stored in the memory to:
begin a packet capture process to capture data associated with requesting and receiving content associated with a web page, where when beginning the packet capture process the processor is to execute one or more of the plurality of instructions to:
set a filter to capture received hypertext transfer protocol (HTTP) packets,
set a filter to capture transmitted HTTP packets,
set a filter to capture received domain name service (DNS) packets, and
set a filter to capture transmitted DNS packets,
invoke, in response to beginning the packet capture process, a browser application, of the device, to request the content associated with the web page,
capture, via the packet capture process, the data associated with requesting and receiving the content associated with the web page,
derive performance information associated with the data captured via the packet capture process,
end the packet capture, and
store the information associated with the derived performance information to output files.

9. The device of claim 8, where the device comprises one or more of:
a radiotelephone,
a personal communications system (PCS) terminal,
a personal digital assistant (PDA),
a laptop computer,
a personal computer, or
a network device.

10. The device of claim 8, where the processor further executes one or more of the plurality of instructions stored in the memory to:
receive a list of web page uniform resource locators (URLs), and
select a web page URL from the received list of web page URLs, where the selected web page URL is associated with the web page.

11. The device of claim 10, where the processor further executes one or more of the plurality of instructions stored in the memory to:
determine whether there is at least one unselected web page URL in the list of web page URLs, select another web page URL from the list of web page URLs and repeat the beginning, the invoking, the capturing, the ending, and the storing, for the other web page URL, when there is at least the one unselected web page URL in the list of web page URLs, and provide the output files to another device when there is not at least one unselected web page URL in the list of web page URLs.

12. The device of claim 8, where the performance information comprises download performance information associated with the web page.

13. The device of claim 12, where the download performance information comprises one or more of:
a web page download response time,
inline object response times,
inline object throughputs,
round trip times of transport control protocol (TCP) handshakes associated with inline objects,
round trip times of hypertext transfer protocol (HTTP) GET requests associated with inline objects,
a number or retransmissions to the computing device, or
a cumulative sum of response times of domain name service (DNS) queries associated with a web page transaction.

14. The device of claim 11, where the data associated with requesting and receiving the content associated with the web page comprises a plurality of packets, and
where the processor further executes one or more of the plurality of instructions stored in the memory to:
the plurality of packets,
generate a hash key for each packet, of the plurality of packets,
generate a hash table of transport control protocol (TCP) connection objects based on the hash keys,
calculate inline object level statistics based on the hash table,
group the TCP connection objects of the hash table according to common web pages,
calculate page level statistics based on the grouped TCP connection objects, and
calculate connection level statistics based on the grouped TCP connection objects.

15. A system, comprising:
means for invoking a browser application to access a web page;
means for capturing data associated with requesting and receiving the web page, the means for capturing the data associated with requesting and receiving the web page including:
means for setting a filter to capture received hypertext transfer protocol (HTTP) packets,
means for setting a filter to capture transmitted HTTP packets,
means for setting a filter to capture received domain name service (DNS) packets, and
means for setting a filter to capture transmitted DNS packets;
means for deriving performance information associated with the data associated with requesting and receiving the web page, the derived performance information including download performance information associated with the webpage;
means for parsing the derived performance information to extract statistics associated with requesting the content and statistics associated with receiving the content; and
means for storing information associated with the derived performance information to output files.

16. A computer-readable memory device storing instructions, the instructions comprising:
one or more instructions which, when executed by a computer, cause the computer to invoke a browser application to access a web page;
one or more instructions which, when executed by the computer, cause the computer to capture data associated with requesting and receiving content associated with accessing the web page, the one or more instructions to capture the data including:
one or more instructions to set a filter to capture received hypertext transfer protocol (HTTP) packets,
one or more instructions to set a filter to capture transmitted HTTP packets,
one or more instructions to set a filter to capture received domain name service (DNS) packets, and
one or more instructions to set a filter to capture transmitted DNS packets;
one or more instructions which, when executed by the computer, cause the computer to derive performance information associated with the data, the derived performance information including download performance information associated with the webpage; and
one or more instructions which, when executed by the computer, cause the computer to parse the derived performance information to extract statistics associated with requesting the content and statistics associated with receiving the content; and
one or more instructions which, when executed by the computer, cause the computer to store information associated with the derived performance data to output files.

17. the computer-readable memory device of claim 16, the instructions further comprising:
one or more instructions to receive a list of web page uniform resource locators (URLs);
one or more instructions to select a web page URL from the received list of web page URLs, where the selected web page URL is associated with the web page, and
one or more instructions to select another web page URL from the list of web page URLs and repeating, for the other web page URL, the invoking, capturing, and storing the information associated with the derived performance information; and
one or more instructions to provide the output files to a device when there is not at least one unselected web page URL in the list of web page URLs.

18. The computer-readable memory device of claim 16, where the download performance information comprises one or more of:
a web page download response time,
inline object response times,
inline object throughputs,
round trip times of transport control protocol (TCP) handshakes associated with inline objects,
round trip times of hypertext transfer protocol (HTTP) GET requests associated with inline objects,
a number or retransmissions to the computing device, or
a cumulative sum of response times of domain name service (DNS) queries associated with a web page transaction.

19. The computer-readable memory device of claim 16, where the one or more instructions to capture the data further comprise:
one or more instructions to set, prior to accessing the web page, the filter to capture received hypertext transfer protocol (HTTP) packets;

one or more instructions to set, prior to accessing the web page, the filter to capture transmitted HTTP packets:

one or more instructions to set, prior to accessing the web page, the filter to capture received domain name Service (DNS) packets; and one or more instructions to set, prior to accessing the web page, the filter to capture transmitted DNS packets.

20. The computer-readable memory device of claim 16, where the data associated with requesting and receiving the content comprises a plurality of packets, the instructions further comprising:

one or more instructions to store the plurality of packets, one or more instructions to generate a hash key for each of the plurality of packets, one or more instructions to generate a hash table of transport control protocol (TCP) connection objects based on the hash keys, one or more instructions to calculate inline object level statistics based on the hash table, one or more instructions to group the TCP connection objects of the hash table according to common web pages, one Or more instructions to calculate page level statistics based on the grouped TCP connection objects, and one or more instructions to calculate connection level statistics based on the grouped TCP connection objects.

21. A computer-readable memory device of claim 20, the instructions further comprising:

one or more instructions to concatenate the page level statistics to a page statistics output file;

one or more instructions to concatenate the connection level statistics to a connection statistics output file; and one or more instructions to concatenate the inline object level statistics to an inline object statistics output file.

\* \* \* \* \*